(12) United States Patent
Hong et al.

(10) Patent No.: US 12,277,286 B2
(45) Date of Patent: Apr. 15, 2025

(54) SENSOR DEVICE, DISPLAY DEVICE INCLUDING THE SAME, AND METHOD OF CONTROLLING SENSOR NODES

(71) Applicant: SAMSUNG DISPLAY CO., LTD., Yongin-si (KR)

(72) Inventors: Jin Taek Hong, Yongin-si (KR); Ja Seung Ku, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/515,817

(22) Filed: Nov. 21, 2023

(65) Prior Publication Data

US 2024/0329774 A1 Oct. 3, 2024

(30) Foreign Application Priority Data

Mar. 28, 2023 (KR) .................. 10-2023-0040769

(51) Int. Cl.
*G06F 3/041* (2006.01)
*G06F 3/044* (2006.01)

(52) U.S. Cl.
CPC ...... *G06F 3/04166* (2019.05); *G06F 3/04184* (2019.05); *G06F 3/0446* (2019.05); *G06F 2203/04107* (2013.01)

(58) Field of Classification Search
CPC ............. G06F 3/04166; G06F 3/04184; G06F 3/0446; G06F 2203/04107
See application file for complete search history.

(56) References Cited

U.S. PATENT DOCUMENTS

| 2020/0193914 A1* | 6/2020 | Shin ..................... G09G 3/3688 |
| 2021/0081070 A1* | 3/2021 | Kang .................... G06F 3/0446 |
| 2021/0200414 A1* | 7/2021 | Lee ....................... G06F 3/0418 |
| 2022/0171498 A1* | 6/2022 | Oh ...................... G06F 3/04166 |
| 2023/0100570 A1* | 3/2023 | Sadeghipour ......... G06F 3/0445 |
| 2023/0131983 A1  | 4/2023 | Park et al. |

FOREIGN PATENT DOCUMENTS

| KR | 10-2021-0050242 | 5/2021 |
| KR | 10-2023-0059954 | 5/2023 |

* cited by examiner

*Primary Examiner* — Jonathan A Boyd
(74) *Attorney, Agent, or Firm* — F. Chau & Associates, LLC

(57) ABSTRACT

A sensor device includes a sensor array including a plurality of sensor nodes, signal lines electrically connected to the plurality of sensor nodes, and a sensor driver configured to sense a user's touch of the sensor array by selecting the plurality of sensor nodes through the signal lines, apply a first pulse signal having a same phase as a target pulse signal of a selected sensor node to at least one first sensor node adjacent to the selected sensor node among the plurality of sensor nodes, and apply a second pulse signal having a phase opposite to that of the first pulse signal to at least one second sensor node among the plurality of sensor nodes. The sensor driver sets at least one sensor node adjacent to or spaced apart from the first sensor node as the second sensor node according to a preset mode.

20 Claims, 13 Drawing Sheets

SENSOR DEVICE, DISPLAY DEVICE INCLUDING THE SAME, AND METHOD OF CONTROLLING SENSOR NODES

CROSS-REFERENCE TO RELATED APPLICATION

This U.S. patent application claims priority under 35 U.S.C. § 119 to Korean Patent Application No. 10-2023-0040769, filed on, Mar. 28, 2023, the disclosure of which is incorporated by reference in its entirety herein.

1. TECHNICAL FIELD

The disclosure relates to an electronic device, and more particularly, to a sensor device for sensing a touch of a user, a display device including the sensor device, and a method of controlling sensor nodes.

2. DISCUSSION OF RELATED ART

Multimedia electronic devices such as a television, a mobile phone, a tablet computer, a navigation device, and a game console may include a display device for displaying an image. The electronic devices may include a touch sensor device that enables a user to input information.

Signals applied to electrodes of the touch sensor device may produce electromagnetic interference (EMI) inside the touch sensor device, the display device or the electronic device. Accordingly, the EMI may reduce reliability of operations of the touch sensor device, the display device, or the electronic device.

SUMMARY

At least one embodiment of the disclosure provides a sensor device and a method of controlling the same in which generation of EMI is minimized or at least reduced while a touch sensitivity reduction is compensated. For example, the sensor device may apply a first pulse signal having the same phase as a selected sensor node to a first sensor node adjacent to the selected sensor node, and a second pulse signal having a phase opposite to that of the first pulse signal to a second sensor node. At this time, the second sensor node may be set to at least one sensor node adjacent to or spaced apart from the first sensor node according to a preset mode. Accordingly, the sensor device may minimize or at least reduce EMI while compensating for a touch sensitivity reduction caused by applying the second pulse signal having an opposite phase to the second sensor node.

According to an embodiment of the disclosure, a sensor device includes a sensor array, signal lines, and a sensor driver. The sensor array includes a plurality of sensor nodes. The signal lines are electrically connected to the plurality of sensor nodes. The sensor driver is configured to sense a user's touch of the sensor array by selecting the plurality of sensor nodes through the signal lines, apply a first pulse signal having a same phase as a target pulse signal of a selected sensor node to at least one first sensor node adjacent to the selected sensor node among the plurality of sensor nodes, and apply a second pulse signal having a phase opposite to that of the first pulse signal to at least one second sensor node among the plurality of sensor nodes. The sensor driver sets at least one sensor node adjacent to or spaced apart from the first sensor node as the second sensor node according to a preset mode.

The sensor driver may set the at least one sensor node spaced apart from the first sensor node as the second sensor node when the preset mode is a first mode.

The sensor driver may set the at least one sensor node adjacent the first sensor node as the second sensor node when the preset mode is a second mode different from the first mode.

The sensor driver may set the at least one second sensor node from the plurality of sensor nodes according to a position of the selected sensor node within the sensor array.

The sensor array may include pads connected to at least a portion of the plurality of sensor nodes at one side. The sensor driver may set sensor nodes disposed in a first area of the sensor array as the second sensor nodes when the selected sensor node is a third sensor node among the plurality of sensor nodes. The sensor driver may set sensor nodes disposed in a second area of the sensor array as the second sensor nodes when the selected sensor node is a fourth sensor node positioned closer to the one side of the sensor array than the third sensor node among the plurality of sensor nodes. The number of sensor nodes of the first area may be greater than the number of sensor nodes of the second area.

The sensor array may have a first width in a first direction, may have a second width greater than the first width in a second direction crossing the first direction, and the one side of the sensor array may extend in the first direction.

The sensor array may include pads connected to at least a portion of the plurality of sensor nodes at one side. When the selected sensor node is a third sensor node among the plurality of sensor nodes, the at least one second sensor node may be spaced apart from the at least one first sensor node by a first distance. When the selected sensor node is a fourth sensor node positioned closer to the one side of the sensor array than the third sensor node among the plurality of sensor nodes, the at least one second sensor node may be spaced apart from the at least one first sensor node by a second distance. The first distance may be shorter than the second distance.

Each of the first pulse signal and the second pulse signal may be toggled between a first voltage level and a second voltage level. In a time period in which the first pulse signal transitions from the first voltage level to the second voltage level, the second pulse signal may transition from the second voltage level to the first voltage level.

Each of the plurality of sensor nodes may be connected to a corresponding one of the signal lines.

According to an embodiment of the disclosure, a method is provided for controlling sensor nodes to sense a user's touch. The method includes: selecting a sensor node among a plurality of sensor nodes included in a sensor array; applying a first pulse signal having a same phase as a target pulse signal of the selected sensor node to at least one first sensor node adjacent to the selected sensor node among the plurality of sensor nodes; and applying a second pulse signal having a phase opposite to that of the first pulse signal to at least one second sensor node among the plurality of sensor nodes, when the first pulse signal is applied. At least one sensor node adjacent to or spaced apart from the first sensor node is set as the second sensor node according to a preset mode.

When the preset mode is a first mode, the at least one sensor node spaced apart from the first sensor node may be set as the second sensor node.

When the preset mode is a second mode different from the first mode, the at least one sensor node spaced apart from the first sensor node may be set as the second sensor node.

The at least one second sensor node may be set from the plurality of sensor nodes according to a position of the selected sensor node within the sensor array.

The sensor array may include pads connected to at least a portion of the plurality of sensor nodes at one side. Sensor nodes disposed in a first area of the sensor array may be set as the second sensor nodes when the selected sensor node is a third sensor node among the plurality of sensor nodes. Sensor nodes disposed in a second area of the sensor array may be set as the second sensor nodes when the selected sensor node is a fourth sensor node positioned closer to the one side of the sensor array than the third sensor node among the plurality of sensor nodes. The number of sensor nodes of the first area may be greater than the number of sensor nodes of the second area.

The sensor array may have a first width in a first direction, may have a second width greater than the first width in a second direction crossing the first direction, and the one side of the sensor array may extend in the first direction.

The sensor array may include pads connected to at least a portion of the plurality of sensor nodes at one side. When the selected sensor node is a third sensor node among the plurality of sensor nodes, the at least one second sensor node may be spaced apart from the at least one first sensor node by a first distance. When the selected sensor node is a fourth sensor node positioned closer to the one side of the sensor array than the third sensor node among the plurality of sensor nodes, the at least one second sensor node may be spaced apart from the at least one first sensor node by a second distance. The first distance may be shorter than the second distance.

Each of the first pulse signal and the second pulse signal may be toggled between a first voltage level and a second voltage level. In a time period in which the first pulse signal transitions from the first voltage level to the second voltage level, the second pulse signal may transition from the second voltage level to the first voltage level.

Each of the plurality of sensor nodes may be connected to a corresponding one of the signal lines.

According to an embodiment of the disclosure, a display device include a display panel, a display driver, a sensor array, signal lines, and a sensor driver. The display includes a plurality of pixels. The display driver is configured to drive the plurality of pixels. The sensor array overlaps the display panel and includes a plurality of sensor nodes. The signal lines are electrically connected to the plurality of sensor nodes. The sensor driver is configured to sense a user's touch of the sensor array by applying a target pulse signal to a selected one of the plurality of sensor nodes, applying a first pulse signal having a same phase as the target pulse signal to at least one first sensor node adjacent to the selected sensor node among the plurality of sensor nodes, and applying a second pulse signal having a phase opposite to that of the first pulse signal to at least one second sensor node among the plurality of sensor nodes.

The at least one sensor node may be adjacent to the first sensor node during a first mode and spaced apart from the first sensor during a second other mode.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Hereinafter, embodiments according to the disclosure are described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiments described herein.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Figure 1:
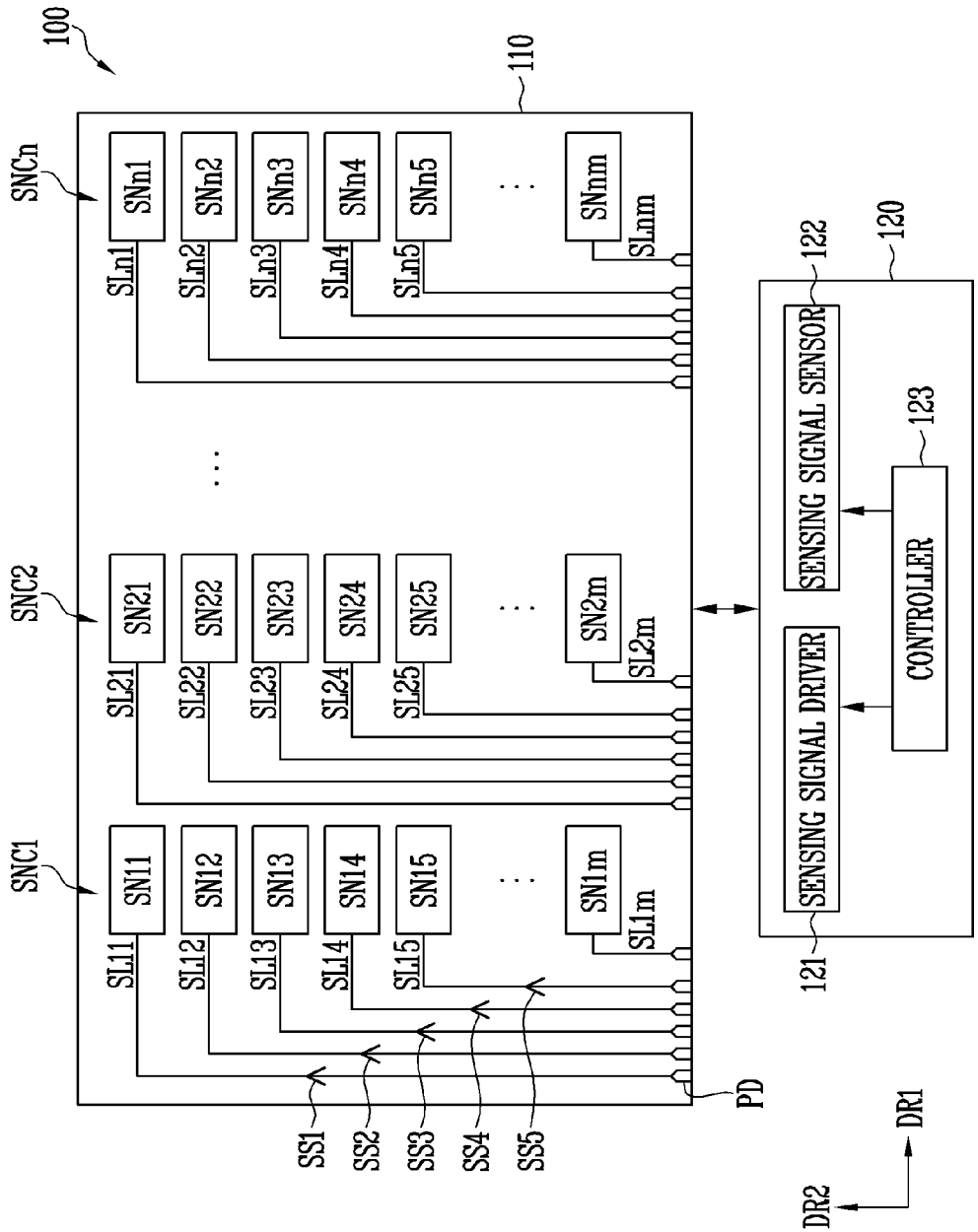
FIG. 1 is a block diagram of a sensor device according to an embodiment of the disclosure.

FIG. 1 is a block diagram of a sensor device according to an embodiment of the disclosure. For example, the sensor device may be configured to sense a touch by a user.

Referring to FIG. 1, the sensor device 100 includes a sensor array 110 and a sensor driver 120 (e.g., a driver circuit).

The sensor array 110 may include an arrangement of a plurality of sensor nodes SN11 to SN1$m$, SN21 to Sn2*m*, . . . , and SNn1 to SNn*m* (each of m and n is an integer greater than 1). The plurality of sensor nodes SN11 to SN1*m*, SN21 to Sn2*m*, . . . , and SNn1 to SNn*m* may be arranged in a first direction DR1 and a second direction DR2 and may be spaced apart from each other. For example, the first direction DR1 may be defined as a row direction, and the second direction DR2 may be defined as a column direction. Each of the plurality of sensor nodes SN11 to SN1*m*, SN21 to Sn2*m*, . . . , and SNn1 to SNn*m* may have a self-capacitance. In an embodiment, each of the plurality of sensor nodes SN11 to SN1*m*, SN21 to Sn2*m*, . . . , and SNn1 to SNn*m* is or includes an electrode for sensing a touch. For example, the electrode may sense the touch in a self-capacitance manner.

The sensor array 110 may further include a plurality of sensing lines SL11 to SL1*m*, SL21 to SL2*m*, . . . , and SLn1 to SLn*m*. The plurality of sensing lines SL11 to SL1*m*, SL21 to SL2*m*, . . . , and SLn1 to SLn*m* may be provided as signal lines for transferring signals from the sensor driver 120 to the plurality of sensor nodes SN11 to SN1*m*, SN21 to Sn2*m*, . . . , and SNn1 to SNn*m*.

The plurality of sensor nodes SN11 to SN1*m*, SN21 to Sn2*m*, . . . , and SNn1 to SNn*m* may be connected to the plurality of sensing lines SL11 to SL1*m*, SL21 to SL2*m*, . . . , and SLn1 to SLn*m* in a one-to-one manner. In FIG. 1, sensor nodes SN11 to SN1*m* may be respectively connected to sensing lines SL11 to SL1*m*, sensor nodes SN21 to SN2*m* may be respectively connected to sensing lines SL21 to SL2*m*, and sensor nodes SNn1 to SNn*m* may be respectively connected to sensing lines SLn1 to SLn*m*. For example, the sensor nodes SN11 to SN1*m* may be arranged in a first column SNC1, the sensor nodes SN21 to SN2*m* may be arranged in a second column SNC2, etc.

The sensor array 110 may further include a plurality of pads PD. The plurality of sensing lines SL11 to SL1*m*, SL21 to SL2*m*, . . . , and SLn1 to SLn*m* may be connected to the sensor driver 120 through the plurality of pads PD. Each of the plurality of pads PD may be or include a conductive material.

In FIG. 1, a portion of the signals transferred through the plurality of sensing lines SL11 to SL1*m*, SL21 to SL2*m*, . . . , and SLn1 to SLn*m* is shown for convenience of description. For example, a first sensing line SL11 may transfer a first sensing signal SS1 from the sensor driver 120 to a first sensor node SN11, a second sensing line SL12 may transfer a second sensing signal SS2 from the sensor driver 120 to a second sensor node SN12, a third sensing line SL13 may transfer a third sensing signal SS3 from the sensor driver 120 to a third sensor node SN13, a fourth sensing line SL14 may transfer a fourth sensing signal SS4 from the sensor driver 120 to a fourth sensor node SN14, and a fifth sensing line SL15 may transfer a fifth sensing signal SS5 from the sensor driver 120 to a fifth sensor node SN15.

The sensor driver 120 is configured to sense a user's touch adjacent to the sensor array 110 by driving the sensor array 110. In an embodiment, the sensor driver 120 includes a sensing signal driver 121 (e.g., a driver circuit), a sensing signal sensor 122, and a controller 123 (e.g., a controller circuit). Here, the controller 123 may be configured to control overall operations of the sensor driver 120 by transmitting control signals to the sensing signal driver 121 and the sensing signal sensor 122.

In response to control of the controller 123, the sensing signal driver 121 may apply sensing signals to the plurality of sensor nodes SN11 to SN1*m*, SN21 to SN2*m*, . . . , and SNn1 to SNn*m* through the plurality of sensing lines SL11 to SL1*m*, SL21 to Sl2*m*, . . . , and SLn1 to SLn*m*. The sensing signal driver 121 may select a corresponding sensor node by applying a target pulse signal as a sensing signal to one of the plurality of sensor nodes SN11 to SN1*m*, SN21 to SN2*m*, . . . , and SNn1 to SNn*m*. For example, the sensing signal driver 121 may sequentially select each of the plurality of sensor nodes SN11 to SN1*m*, SN21 to SN2*m*, . . . , and SNn1 to SNn*m*. As another example, the sensing signal driver 121 may simultaneously select two or more sensor nodes. Specifically, the plurality of sensor nodes SN11 to SN1*m*, SN21 to SN2*m*, . . . , and SNn1 to SNn*m* may be grouped into first to n-th sensor node columns SNC1 to SNCn including sensor nodes arranged in the column direction, respectively. In addition, sensor nodes may be sequentially selected in each of the first to n-th sensor node columns SNC1 to SNCn. As still another example, column groups each including two or more sensor node columns may be defined. In addition, the sensor nodes may be sequentially selected in each of the defined column groups.

The sensing signal sensor 122 may be configured to sense the user's touch adjacent to the plurality of sensor nodes SN11 to SN1*m*, SN21 to SN2*m*, . . . , and SNn1 to SLn*m* through the plurality of sensing lines SL11 to SL1*m*, SL21 to SL2*m*, . . . , and SLn1 to SLn*m* in response to the control of the controller 123. A capacitance corresponding to a given sensor node among the plurality of sensor nodes SN11 to SN1*m*, SN21 to SN2*m*, . . . , and SNn1 to SLn*m* may change according to the user's touch. In addition, a change in the capacitance may cause a change in a target pulse signal applied to the corresponding given sensor node. Accordingly, the sensing signal sensor 122 may sense the user's touch by sensing the change in the target pulse signal. For example, the sensor driver 120 may sense the user's touch on the sensor array 110 using a self-capacitance method. As described above, the sensing signal sensor 122 may be configured to sense the user's touch by sensing a change in capacitance of a sensor node of the sensor array 110 selected by the sensing signal driver 121.

According to an embodiment of the disclosure, the sensor driver 120 applies a first pulse signal having the same phase as the target pulse signal to at least one sensor node adjacent to the selected sensor node, when each sensor node is selected. In a further embodiment, the sensor driver 120 applies a second pulse signal having a phase opposite to that of the first pulse signal to at least one sensor node of the sensor array 110 except for the selected sensor node and the sensor node to which the first pulse signal is applied. In an embodiment, the sensor driver 120 adjusts a voltage level of the first and second pulse signals in a time period in which the first and second pulse signals are applied. In an embodiment, the sensor driver 120 applies the first pulse signal to a sensor node adjacent to the selected sensor node and the second pulse signal to a sensor node spaced apart from the selected sensor node. In this case, the sensor driver 120 may reduce electromagnetic interference (EMI) caused by the first and second pulse signals without reducing touch sensitivity of the sensor array 110. Therefore, operations of the sensor device 100 and a system and/or a device including the sensor device 100 may have increased reliability.

Figure 2:
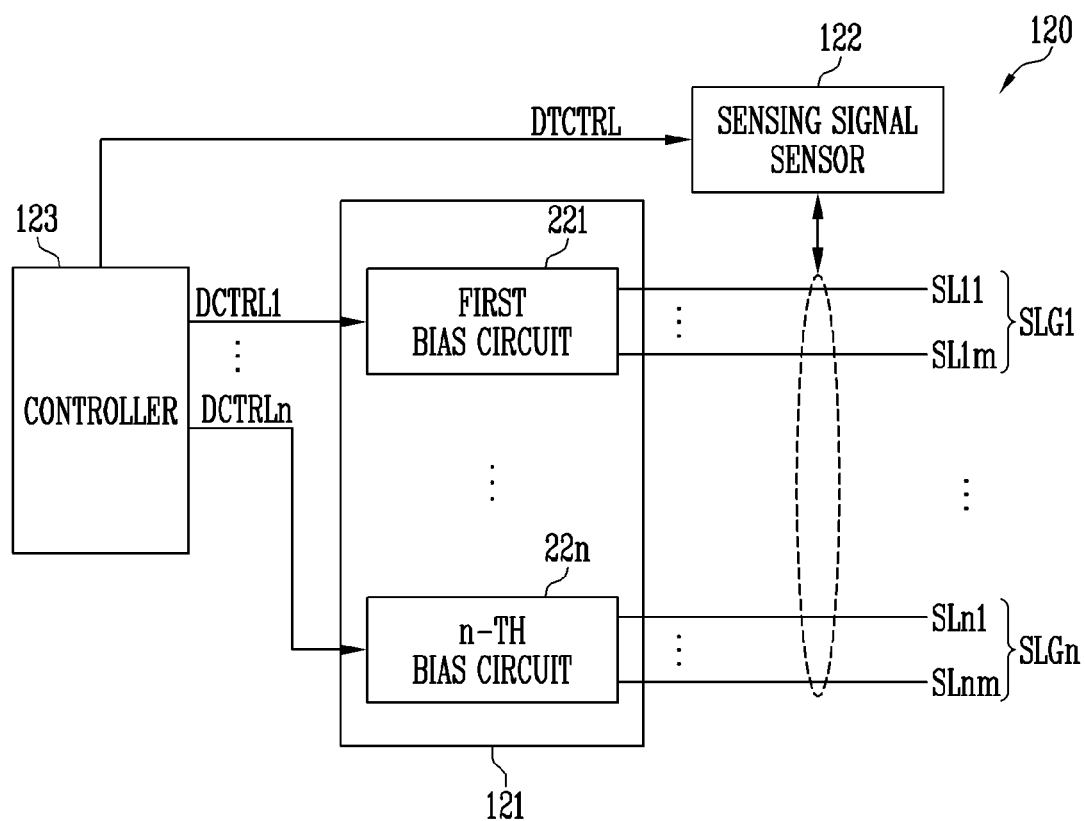
FIG. 2 is a block diagram illustrating an embodiment of a sensor driver of FIG. 1.

FIG. 2 is a block diagram illustrating an embodiment of the sensor driver of FIG. 1.

Referring to FIG. 2, the sensor driver 120 includes the controller 123, the sensing signal driver 121, and the sensing signal sensor 122.

The controller 123 may be configured to control overall operations of the sensor driver 120. The controller 123 may transmit first to n-th driving control signals DCTRL1 to DCTRLn to first to n-th bias circuits 221 to 22n of the sensing signal driver 121 to control the first to n-th bias circuits 221 to 22n. For example, the controller 123 may transmit one driving control signal to each of the first to n-th bias circuits 221 to 22n. In addition, the controller 123 may transmit a sensing control signal DTCTRL to the sensing signal sensor 122 to control the sensing signal sensor 122.

The sensor driver 120 of FIG. 1 may be provided in a form shown in FIG. 2. The sensing signal driver 121 may include the first to n-th bias circuits 221 to 22n. The first to n-th bias circuits 221 to 22n may operate in response to the first to n-th driving control signals DCTRL1 to DCTRLn received from the controller 123, respectively. The first to n-th bias circuits 221 to 22n may drive first to n-th sensing line groups SLG1 to SLGn, respectively. For example, each of the bias circuits may drive two or more sensing lines.

In addition, the first to n-th sensing line groups SLG1 to SLGn may be connected to the first to n-th sensor node columns SNC1 to SNCn of FIG. 1, respectively. The first to m-th sensing lines SL11 to SL1m of the first sensing line group SLG1 may be connected to the first to m-th sensor nodes SN11 to SN1m of the first sensor node column SNC1, respectively. The first to m-th sensing lines SLn1 to SLnm of the n-th sensing line group SLGn may be connected to the first to m-th sensor nodes SNn1 to SNnm of the n-th sensor node column SNCn, respectively. As described above, first to m-th sensing lines SLy1 to SLym of a y-th sensing line group SLGy (where y is an integer greater than or equal to 1 and less than or equal to n) may be connected to first to m-th sensor nodes SNy1 to SNym of a y-th sensor node column SNCy, respectively.

In FIG. 2, the first to n-th bias circuits 221 to 22n are connected to the first to n-th sensing line groups SLG1 to SLGn, respectively, but embodiments are not limited thereto. For example, one bias circuit may be connected to two or more sensing line groups to control the two or more sensing line groups. For example, when a bias circuit is connected to two sensing line groups, the bias circuit could drive four or more sensing lines.

The sensing signal sensor 122 may be connected to the first to n-th sensing line groups SLG1 to SLGn. The sensing signal sensor 122 may operate in response to the sensing control signal DTCTRL received from the controller 123. The sensing signal sensor 122 may be configured to sense the user's touch by sensing a change in voltage and/or current of a sensing line of the selected sensor node. In FIG. 2, the sensing signal sensor 122 is shown as one component, but embodiments are not limited thereto. The sensing signal sensor 122 may be divided into two or more components, and the separated components may be connected to the first to n-th sensing line groups SLG1 to SLGn.

Figure 3:
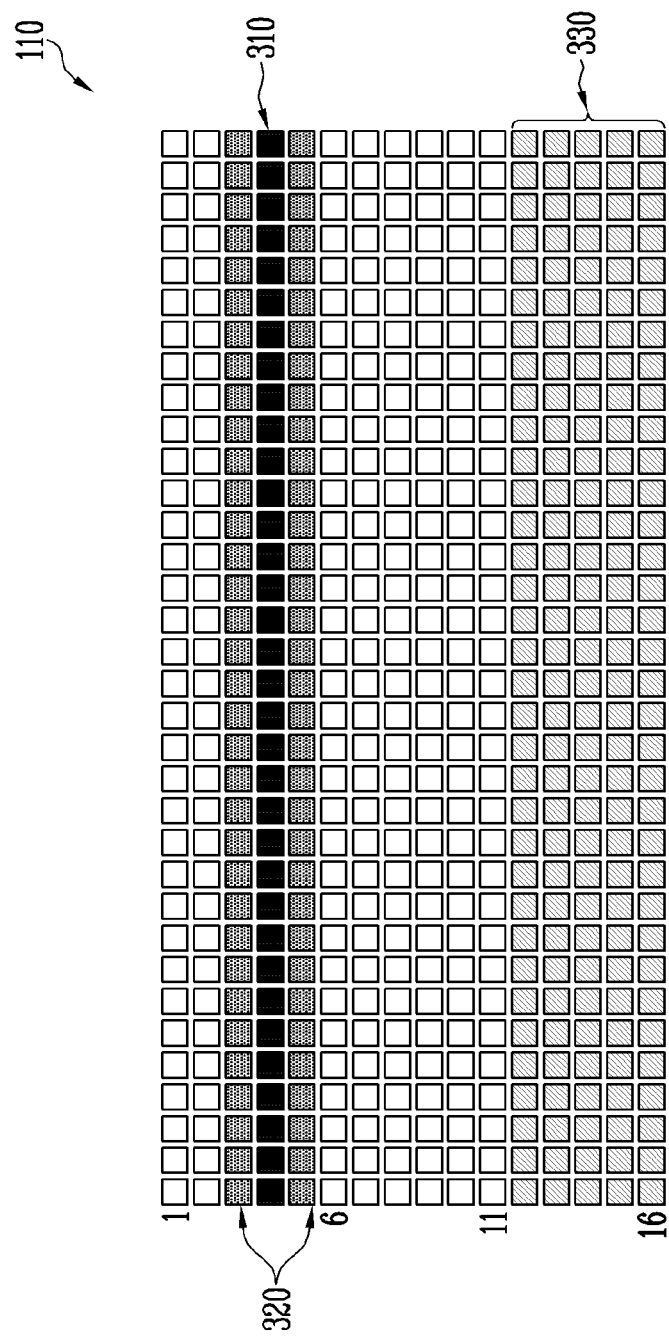
FIGS. 3 and 4 are diagrams illustrating a first sensor node and a second sensor node set or determined according to an operation mode of the sensor device.
Figure 4:
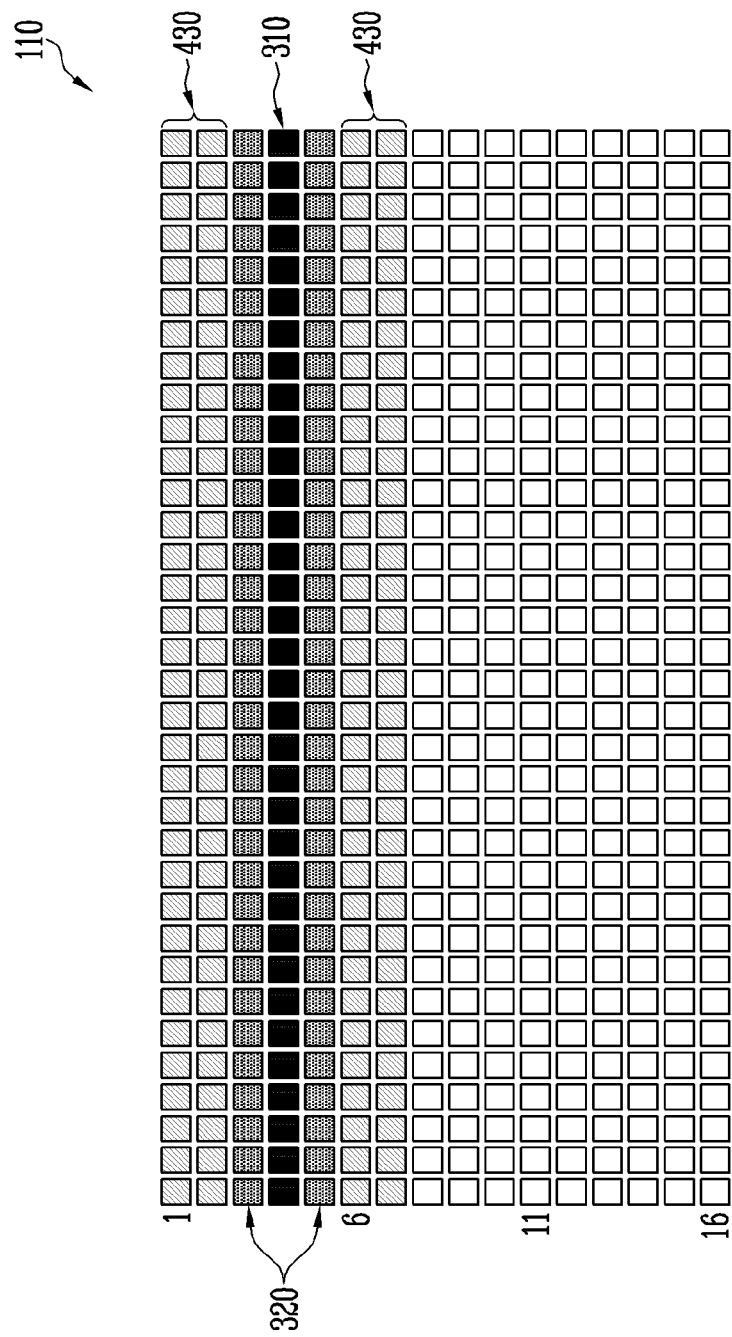

FIGS. 3 and 4 are diagrams illustrating a first sensor node and a second sensor node set according to an operation mode of the sensor device.

In the following description with reference to FIGS. 3 and 4, embodiments in which the sensor driver 120 of FIG. 1 sets first sensor nodes 320 and second sensor nodes according to a preset mode when the user's touch is sensed and a plurality of sensor nodes are selected in the sensor array 110 are described. The sensor driver 120 may apply each of a plurality of pulse signals to selected sensor nodes 310, the first sensor nodes 320, and the second sensor nodes among a plurality of sensor nodes included in the sensor array 110 according to the preset mode. Here, the plurality of sensor nodes may be connected to the signal lines in one-to-one manner. For example, each of the sensor nodes may be connected to a corresponding one of the signal lines.

The sensor driver 120 may select at least one of the plurality of sensor nodes of the sensor array 110 and apply a target pulse signal to the selected sensor nodes 310. In an embodiment, the sensor driver 120 sets or determines the first sensor nodes 320 and the second sensor nodes, applies a first pulse signal to the first sensor nodes 320, and applies a second pulse signal to the second sensor nodes. For example, a sensor node may be selected from each of the first to n-th sensor node columns SNC1 to SNCn, or may be selected from each of column groups including two or more sensor node columns. The sensor node may be sequentially selected along a direction in which the signal line is disposed.

The sensor driver 120 may sets or determines at least one or more sensor nodes adjacent to or spaced apart from the first sensor nodes 320 as second sensor nodes 330 according to the preset mode. The sensor driver 120 may set or determine sensor nodes adjacent to the selected sensor nodes 310 among the plurality of sensor nodes of the sensor array 110 as the first sensor nodes 320. In addition, when the sensor driver 120 operates in the first mode, for example, a single mode, the sensor driver 120 sets or determines the sensor nodes spaced apart from the first sensor nodes 320 as the second sensor nodes 330. Alternatively, when the sensor driver 120 operates in the second mode, for example, a normal mode, the sensor driver 120 sets or determines sensor nodes neighboring or adjacent the first sensor nodes 320 as second sensor nodes 430.

In FIGS. 3 and 4, a row number of the sensor nodes are written on a left side of the sensor array 110. Referring to FIG. 3, when the sensor driver 120 operates in the single mode, the sensor nodes spaced apart from the first sensor nodes 320 may be set or determined as the second sensor nodes 330. For example, as shown in FIG. 3, the selected sensor nodes 310 may be a plurality of sensor nodes of a fourth row. In this case, the sensor driver 120 sets or determines sensor nodes of a third row adjacent to an upper end of the selected sensor nodes 310 and sensor nodes of a fifth row adjacent to a lower end of the selected sensor nodes 310 as the first sensor nodes 320. However, this is exemplary, and embodiments are not limited thereto. For example, sensor nodes of two or more rows adjacent to the upper end of the selected sensor nodes 310 and sensor nodes of two or more rows neighboring the lower end of the selected sensor nodes 310 may be set as the first sensor nodes 320.

When the sensor driver 120 operates in the single mode, sensor nodes spaced apart from the first sensor nodes 320 with at least one or more other sensor nodes interposed therebetween are set or determined as the second sensor nodes 330. For example, the sensor driver 120 may set or determine sensor nodes of twelfth to sixteenth rows spaced apart from the sensor nodes of the fifth row with at least one or more other sensor nodes interposed therebetween as the second sensor nodes 330. However, this is exemplary and embodiments are not limited thereto, and sensor nodes spaced apart from one side of the first sensor nodes 320 may be freely set as the second sensor nodes 330.

In particular, when the sensor array has a large width in a specific direction, the sensor device 100 may operate in the single mode. Specifically, the sensor device 100 may apply a voltage of a phase opposite to that of a driving voltage to the second sensor nodes spaced apart from the first sensor nodes that apply the driving voltage. Therefore, a touch sensitivity reduction problem caused by lack of an offset of a parasitic capacitance formed by a trace may be solved while reducing EMI in a self-dot method.

Next, referring to FIG. 4, when the sensor driver 120 operates in the normal mode, the sensor nodes neighboring or adjacent the first sensor nodes 320 are set or determined as the second sensor nodes 430. For example, as shown in FIG. 4, the selected sensor nodes 310 may be the plurality of sensor nodes of the fourth row. In this case, the sensor driver 120 sets or determines the sensor nodes of the third row adjacent to the upper end of the selected sensor nodes 310 and the sensor nodes of the fifth row adjacent to the lower end of the selected sensor nodes 310 as at least a portion of the first sensor nodes 320.

When the sensor driver 120 operates in the normal mode, the sensor driver 120 sets or determines sensor nodes neighboring the first sensor nodes 320 without an interposed sensor node as the second sensor nodes 430. For example, the sensor driver 120 may set or determine sensor nodes of a second row adjacent to the sensor nodes of the third row as the second sensor nodes 430. Simultaneously, the sensor driver 120 may set sensor nodes of a sixth row adjacent to the sensor nodes of the fifth row as the second sensor nodes 430. In addition, the second sensor nodes 430 may be set to sensor nodes of two or more neighboring rows by including the sensor nodes of the second row and sensor nodes of two or more neighboring rows by including the sensor nodes of the sixth row.

Therefore, in a case where the sensor array 110 has the same or similar width in all directions, the sensor device 100 may operate in the normal mode. Specifically, the sensor device 100 may apply a voltage of a phase opposite to that of a driving voltage to the second sensor nodes 430 neighboring the first sensor nodes 320 applying the driving voltage, thereby reducing EMI in a self-dot method.

Figure 5:
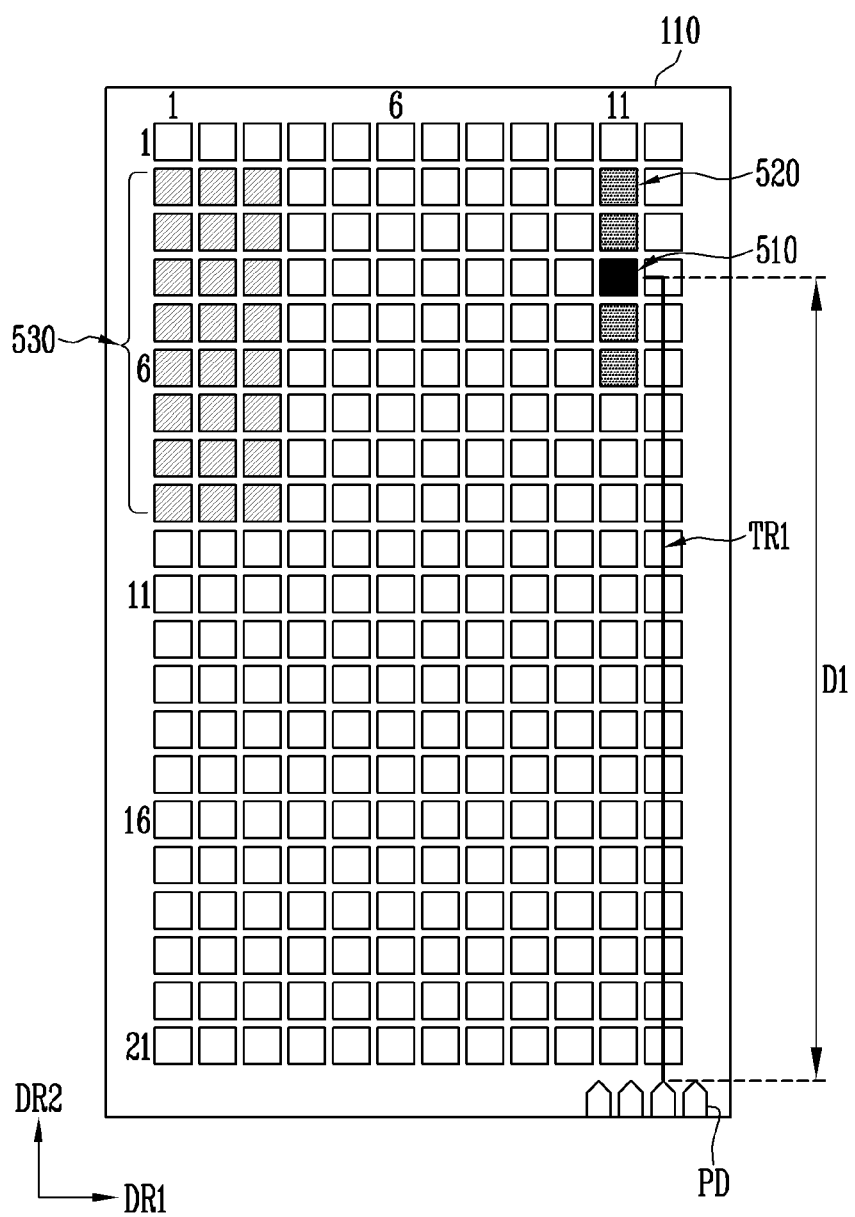
FIG. 5 is a diagram illustrating a second sensor node set or determined according to a position of a selected sensor node in a sensor array.

FIG. 5 is a diagram illustrating a second sensor node set or determined according to a position of the selected sensor node in the sensor array.

In the following description with reference to FIG. 5, an embodiment in which the sensor driver 120 sets or determines first sensor nodes 520 and second sensor nodes 530 according to a position of a selected sensor node 510 in the sensor array 110 when the user's touch is sensed and the plurality of sensor nodes are selected among the sensor array 110 is described. For example, the sensor driver 120 may set or determine the second sensor nodes 530 from the plurality of sensor nodes according to the position of the selected sensor node 510 in the sensor array 110. Here, the sensor array 110 may include a pad PD connected to at least a portion of the plurality of sensor nodes at one side. In an embodiment, the sensor array 110 has a first width in the first direction DR1 and has a second width greater than the first width in the second direction DR2 crossing the first direction. In addition, the one side of the sensor array 110 may extend in the first direction DR1.

The sensor driver 120 may set or determine sensor nodes in the sensor array 110 that are spaced apart in the second direction DR2 from the selected sensor node 510 and sensor nodes surrounding the sensor nodes as the second sensor nodes 530. When the sensor array 110 is a module having a larger width ratio in the second direction DR2 that in the first direction DR1, a length of a trace TR1 may be relatively long according to the position of the selected sensor node 510. As described above, when the selected sensor node 510 is spaced apart from the one side of the sensor array 110 where the pad PD is disposed by a predetermined distance D1, the length of the trace TR1 may be relatively long, and an EMI radiation level may be increased by a signal of the lengthened trace TR1. Accordingly, the sensor driver 120 may set or determine the second sensor nodes 530 to be in an area spaced apart from the selected sensor node 510 in the second direction DR2. EMI may be further reduced by applying a pulse signal having an opposite phase to the second sensor nodes 530 having the same or similar trace length as the selected sensor node 510. For example, the pulse signal having the opposite phase may be applied to a sensor node at a distance greater or less than the length of the trace TR1, where the distance is based on one to five sensor nodes. In FIGS. 5 to 9, a row number of the sensor nodes is written on a left side of the sensor array 110, and a column number of the sensor nodes is written on an upper end of the sensor array 110. As shown in FIG. 5, the selected sensor node 510 may be a sensor node of a fourth row in an eleventh sensor node column. In this case, the sensor driver 120 may set or determine sensor nodes of second and third rows neighboring an upper end of the selected sensor node 510 and sensor nodes of fifth and sixth rows neighboring a lower end of the selected sensor node 510 in the eleventh sensor node column as the first sensor nodes 520. Accordingly, the sensor driver 120 may set or determine sensor nodes of a fourth row as a portion of the second sensor nodes 530 in first to third sensor node columns spaced apart from a first sensor node of the fourth row in the first direction DR1. In addition, the sensor driver 120 may set or determine sensor nodes arranged from sensor nodes of the fourth row in the second direction DR2 and a direction opposite to the second direction DR2 as another portion of the second sensor nodes 530 in the first to third sensor node columns. In other words, an area in which the second sensor nodes 530 are located may be a long area in the second direction DR2 including from the sensor node of the fourth row to sensor nodes of another row.

Figure 6:
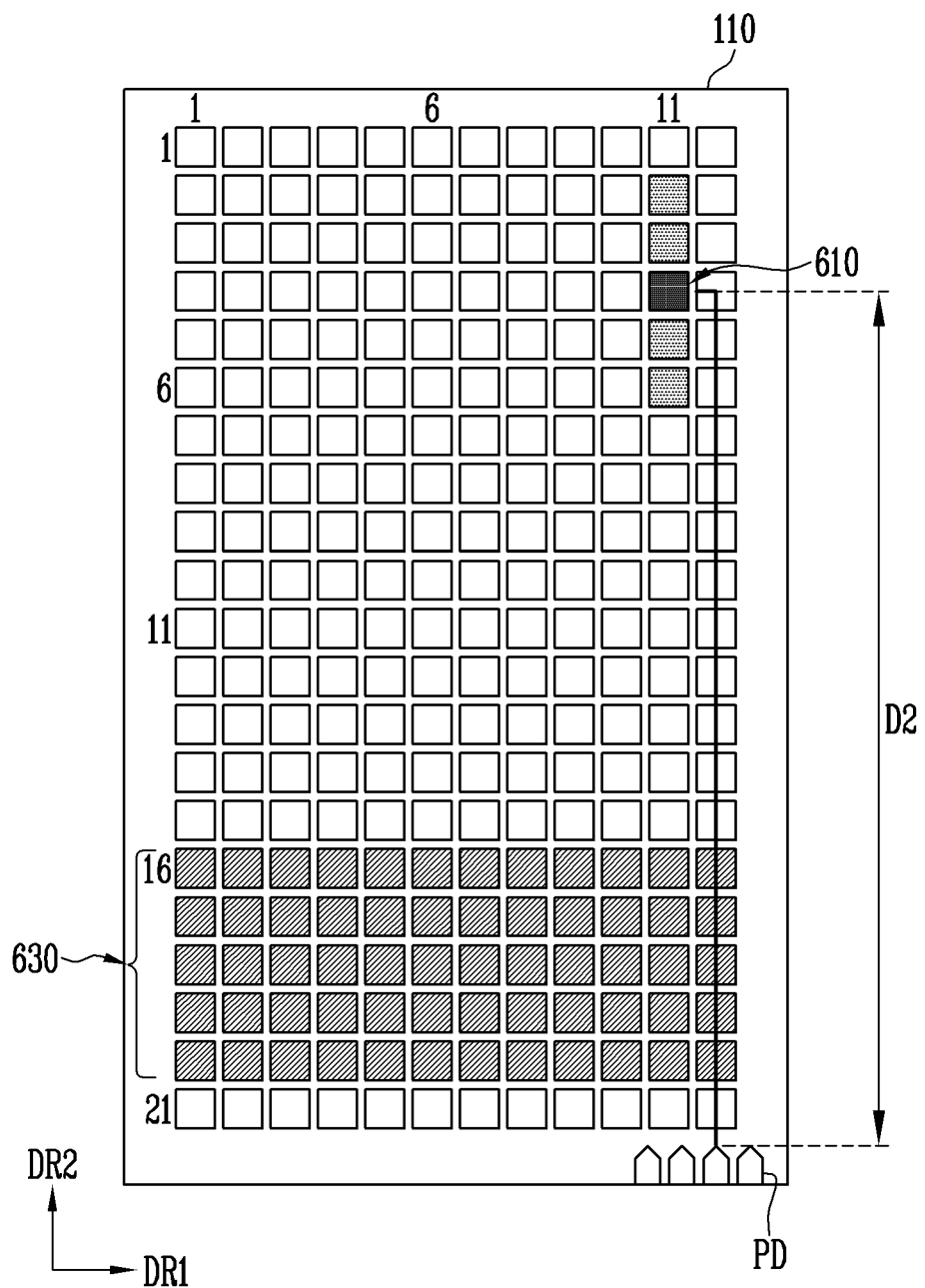
FIGS. 6 and 7 are diagrams illustrating the number of second sensor nodes set according to the position of the selected sensor node in the sensor array.
Figure 7:
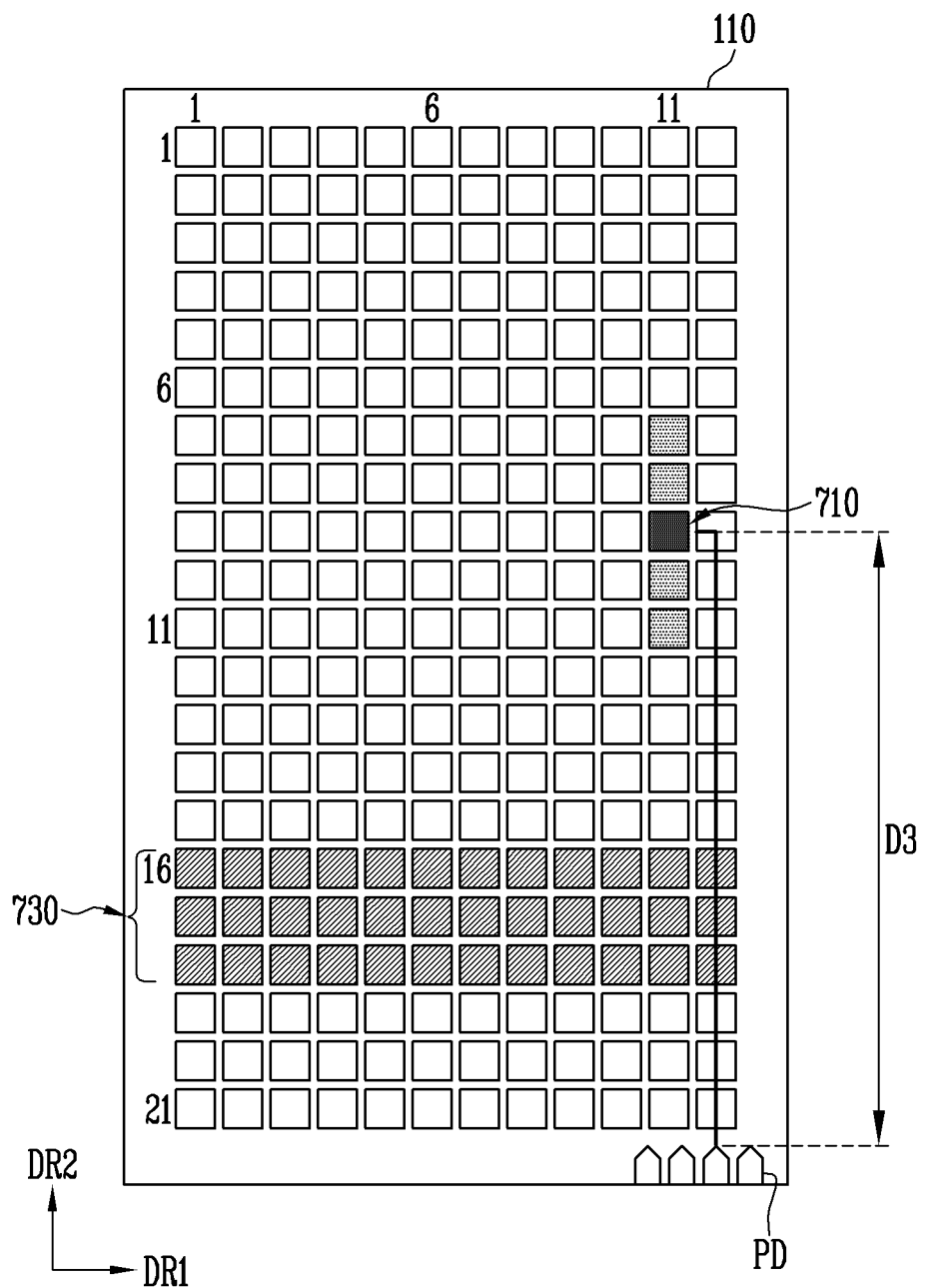

FIGS. 6 and 7 are diagrams illustrating a number of second sensor nodes set or determined according to the position of the selected sensor node in the sensor array.

In the following description with reference to FIGS. 6 and 7, embodiments in which the sensor driver 120 of FIG. 1 sets or determines sensor nodes disposed in a given area of the sensor array 110 as the second sensor nodes according to the position of the selected sensor node in the sensor array 110 when the user's touch is sensed and the plurality of sensor nodes are selected among the sensor array 110 are described. When the selected sensor node is a third sensor node 610 of FIG. 6 among the plurality of sensor nodes, the sensor driver 120 may set or determine sensor nodes disposed in a first area of the sensor array 110 as second sensor nodes 630. When the selected sensor node is a fourth sensor node 710 of FIG. 7 that is positioned closer from one side of the sensor array than the third sensor node 610 among the plurality of sensor nodes, the sensor driver 120 may set or determine sensor nodes disposed in a second area of the sensor array as second sensor nodes 730. In an embodiment, the number of sensor nodes 630 of the first area is greater than the number of sensor nodes 730 of the second area.

Referring to FIG. 6, when the selected sensor node is the third sensor node 610 spaced apart by a predetermined distance D2 from one side of the sensor array 110 where the pad PD is disposed, the sensor driver 120 may set or determine the sensor nodes disposed in the first area of the sensor array as the second sensor nodes 630. For example, a sensor node selected by sensing the user's touch may be a sensor node of a fourth row in an eleventh sensor node column. In this case, the sensor driver 120 may set or determine the sensor nodes disposed in the first area spaced apart from the third sensor node 610 of the fourth row with other sensor nodes interposed therebetween as the second sensor nodes 630. Here, the first area may be an area including sensor nodes of sixteenth to twentieth rows. However, the first area has been described as an example, and is not limited to the corresponding position as long as the first area is an area spaced apart from the third sensor node 610 with other sensor nodes interposed therebetween.

Referring to FIG. 7, when the selected sensor node is the fourth sensor node 710 spaced apart by a predetermined distance D3 from the one side of the sensor array 110 where the pad PD is disposed, the sensor driver 120 may set or determine the sensor nodes disposed in the second area of the sensor array 110 as the second sensor nodes 730. For example, the sensor node selected by sensing the user's touch may be a sensor node of a ninth row in the eleventh sensor node column. In this case, the sensor driver 120 may set or determine the sensor nodes disposed in the second area spaced apart from the fourth sensor node 710 of the ninth row with other sensor nodes interposed therebetween as the second sensor nodes 730. Here, the second area may be an area including sensor nodes of the sixteenth to eighteenth rows. However, the second area has been described as an example, and is not limited to the corresponding position as long as the second area is an area spaced apart from the fourth sensor node 710 with other sensor nodes interposed therebetween.

According to a distance from the one side of the sensor array 110 where the pad PD is disposed to the selected sensor node, the sensor driver 120 may vary the number of second sensor nodes disposed in a given area of the sensor array 110. For example, as the distance from the one side of the sensor array 110 where the pad PD is disposed to the selected sensor node increases, the sensor driver 120 may increase the number of second sensor nodes disposed in the given area of the sensor array 110. Accordingly, when the selected sensor node is positioned in an area where the EMI radiation level is high in the sensor array 110, the sensor driver 120 may further reduce EMI by increasing the area set as the second sensor nodes.

Figure 8:
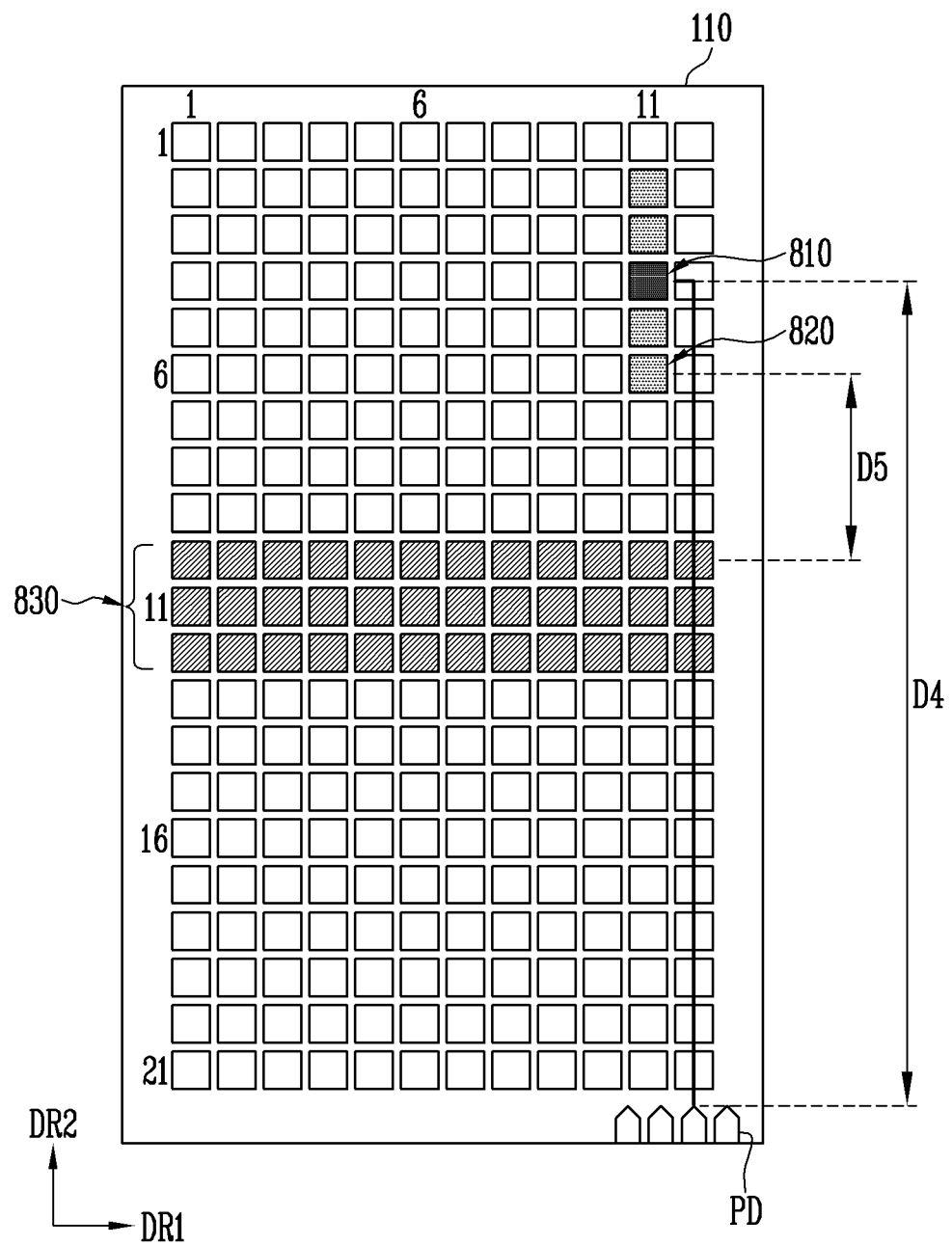
FIGS. 8 and 9 are diagrams illustrating a distance between the first sensor node and the second sensor node set according to the position of the selected sensor node in the sensor array.
Figure 9:
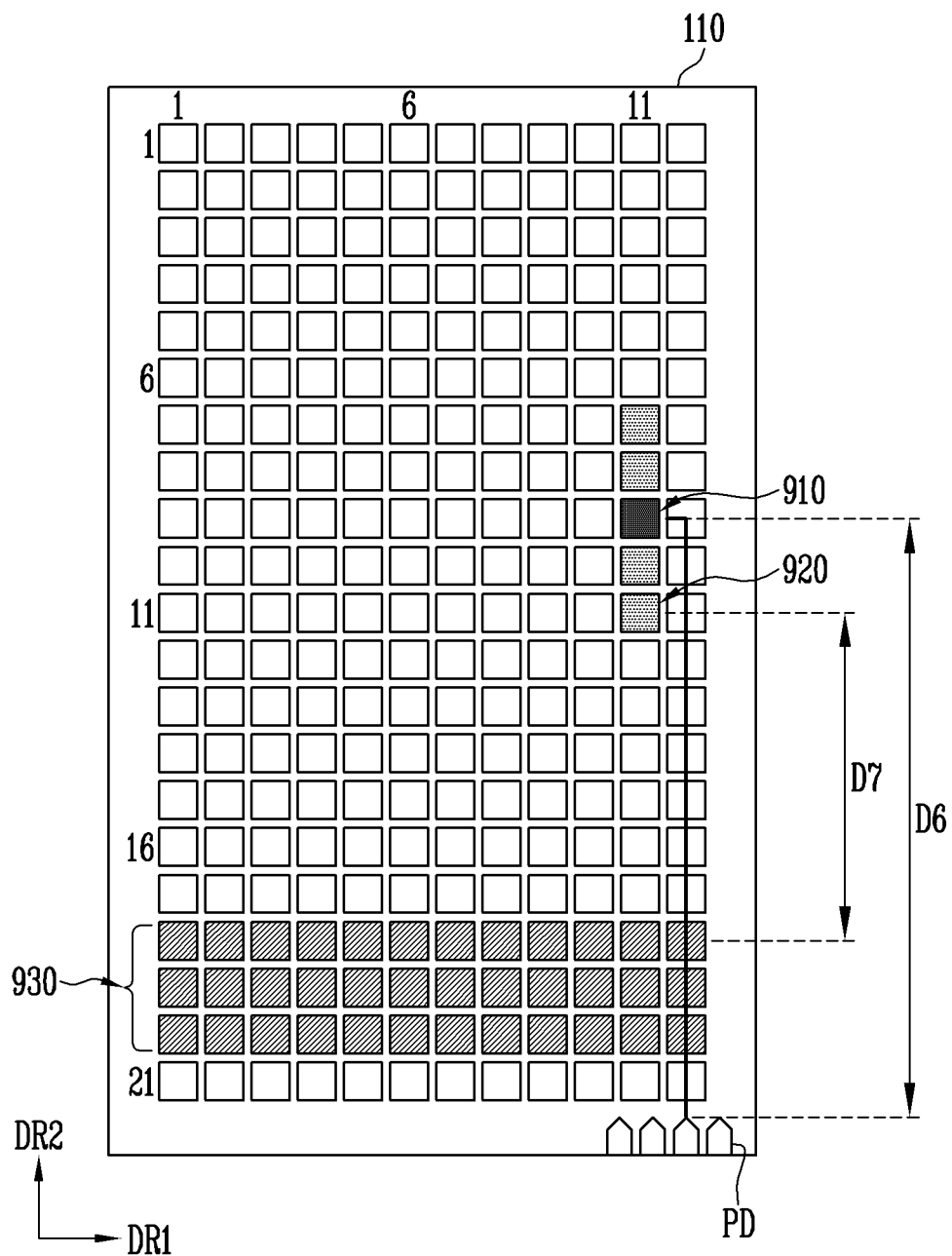

FIGS. 8 and 9 are diagrams illustrating a distance between the first sensor node and the second sensor node set or determined according to the position of the selected sensor node in the sensor array. In the following description with reference to FIGS. 8 and 9, embodiments in which the sensor driver 120 sets or determines sensor nodes disposed in a given area of the sensor array 110 as the second sensor nodes according to the position of the selected sensor node in the sensor array 110, when the user's touch is sensed and the plurality of sensor nodes are selected among the sensor array 110 are described. When the selected sensor node is a third sensor node 810 among the plurality of sensor nodes, the sensor driver 120 may set or determine sensor nodes spaced apart from first sensor nodes 820 by a first distance D5 as second sensor nodes 830. The second sensor nodes 830 may be spaced apart from the first sensor nodes 820 by the first distance D5 or the first distance D5 plus a certain offset (e.g., based on one or two sensor nodes). When the selected sensor node is a fourth sensor node 910 positioned closer from one side of the sensor array 110 than the third sensor node 810 among the plurality of sensor nodes, the sensor driver 120 may set or determine sensor nodes spaced apart from first sensor nodes 920 by a second distance D7 as second sensor nodes 930. In an embodiment, the first distance D5 is shorter than the second distance D7.

Referring to FIG. 8, when the selected sensor node is the third sensor node 810 spaced apart by a predetermined distance D4 from one side of the sensor array 110 where the pad PD is disposed, the sensor driver 120 may set or determine the sensor nodes spaced apart from the sensor nodes 820 by the first distance D5 as the second sensor nodes 830. The second sensor nodes 830 may be spaced apart from the first sensor nodes 820 by the first distance D5 plus a certain offset (e.g., based on one or two sensor nodes). For example, the selected sensor node may be a sensor node of a fourth row in an eleventh sensor node column. In this case, the sensor driver 120 may set or determine sensor nodes of a second row and a third row neighboring an upper end of the selected sensor node and sensor nodes of a fifth row and a sixth row neighboring a lower end of the selected sensor node as the first sensor nodes 820 in the eleventh sensor node column. Accordingly, the sensor driver 120 may set or determine sensor nodes of tenth to twelfth rows spaced apart by the first distance D5 from the first sensor node set to the sensor node of the sixth row with another sensor node therebetween as the second sensor nodes 830.

Referring to FIG. 9, when the selected sensor node is the fourth sensor node 910 spaced apart by a predetermined distance D6 from one side of the sensor array 110 where the pad PD is disposed, the sensor driver 120 may set or determine the sensor nodes spaced apart from the first sensor nodes 920 by the second distance D7 set as the second sensor nodes 930. The second sensor nodes 930 may be spaced apart from the first sensor nodes 920 by the second distance D7 or the second distance D7 plus a certain offset (e.g., based on one or two sensor nodes). For example, the selected sensor node may be a sensor node of a ninth row in an eleventh sensor node column. In this case, the sensor driver 120 may set or determine sensor nodes of a seventh row and an eighth row neighboring an upper end of the selected sensor node and sensor nodes of a tenth row and an eleventh row neighboring a lower end of the selected sensor node as the first sensor nodes 920 in the eleventh sensor node column. Accordingly, the sensor driver 120 may set or determine sensor nodes of eighteenth to twentieth rows spaced apart by the second distance D7 from the first sensor node set to the sensor node of the eleventh row with another sensor node therebetween as the second sensor nodes 930. In an embodiment, the first distance D5 of FIG. 8 is shorter than the second distance D7 of FIG. 9. In FIGS. 8 and 9, the first distance D5 and the second distance D7 are shown as an example of intervals based on centers of sensor nodes. However, the first distance D5 and the second distance D7 are not limited thereto. For example, the first distance D5 and the second distance D7 may be measured based on other points of the sensor nodes.

The sensor driver 120 may differently set distances at which the first sensor nodes and the second sensor nodes are spaced according to a distance from one side of the sensor array 110 where the pad PD is disposed to the selected sensor node. For example, as a distance between the selected sensor node and one side of the sensor array 110 where the pad PD is disposed increase, a length of the trace TR to the selected sensor node may be increased. Accordingly, the sensor driver 120 may set the second sensor nodes so that a distance spaced apart from the first sensor nodes become shorter. As described above, when the selected sensor node is disposed at a position where the EMI radiation level is high in the sensor array 110, the sensor driver 120 may further reduce EMI by setting sensor nodes close to the first sensor nodes as the second sensor nodes.

Figure 10:
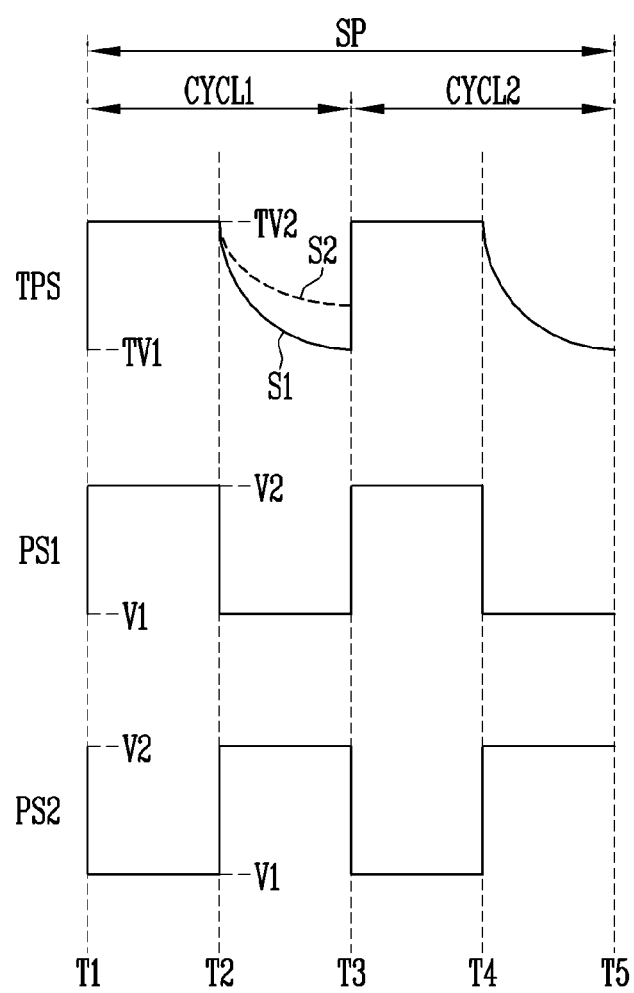
FIG. 10 is a timing diagram illustrating an embodiment of signals applied to sensor nodes of FIG. 3.

FIG. 10 is a timing diagram illustrating an embodiment of signals applied to the sensor nodes of FIG. 3.

In the following description with reference to FIG. 10, embodiments in which at least one sensor node is selected from the sensor array 110 during a sensing period SP and whether or not a user's body is adjacent to the selected sensor nodes 310 is determined are described. As described above, at least one sensor node is selected in each of a plurality of sensing periods to sense the user's touch.

As shown in FIG. 3, the sensor driver 120 of FIG. 1 may apply a pulse signal to each of the first sensor nodes or the second sensor nodes set or determined based on the selected sensor nodes 310. For example, the sensor driver 120 may apply a target pulse signal TSP to the selected sensor nodes 310, apply a first pulse signal PS1 to the first sensor nodes 320, and apply a second pulse signal PS2 to the second sensor nodes 330.

Referring to FIG. 10 below, at a first time T1, the target pulse signal TSP applied to the selected sensor nodes 310 transitions from a first target voltage level TV1 to a second target voltage level TV2. For example, the first and second target voltage levels TV1 and TV2 may be 0V and 5V, respectively. However, this is merely an example as embodiments of the disclosure are not limited thereto.

At a second time T2, the target pulse signal TSP applied to the selected sensor nodes 310 may gradually decrease from the second target voltage level TV2 to the first target voltage level TV1. A slope of a voltage level of the target pulse signal TSP may change according to the user's touch. For example, when the user's touch is not adjacent to the selected sensor nodes 310, the voltage level of the target pulse signal TSP may have a first slope S1. On the other hand, when the user's touch is adjacent to the selected sensor nodes 310, the voltage level of the target pulse signal TSP may have a second slope S2. The sensing signal sensor 122 of FIG. 2 may sense the user's touch according to whether the target pulse signal TSP has the first slope S1 or the second slope S2.

In an embodiment, the first pulse signal PS1 have the same phase as the target pulse signal TSP. At the first time T1, the first pulse signal PS1 applied to the first sensing node 320 may transition from a first voltage level V1 to a second voltage level V2. Simultaneously, the second pulse signal PS2 applied to the second sensing nodes 330 may transition from the second voltage level V2 to the first voltage level V1.

At the second time T2, the first pulse signal PS1 applied to the first sensing nodes 320 may transition from the second voltage level V2 to the first voltage level V1. Simultaneously, the second pulse signal PS2 applied to the second sensing nodes 330 may transition from the first voltage level V1 to the second voltage level V2.

In addition, at a third time T3, the first pulse signal PS1 applied to the first sensing nodes 320 may transition from the first voltage level V1 to the second voltage level V2 again. Simultaneously, the second pulse signal PS2 applied to the second sensing nodes 330 may transition from the second voltage level V2 to the first voltage level V1 again. For example, the first and second voltage levels V1 and V2 may be 0V and 10V, respectively. However, this is merely an example, as embodiments of the disclosure are not limited thereto.

Here, a time period between the first and third times T1 and T3 may be referred to as a first time cycle CYCL1. Operations in the third time T3, a fourth time T4, and a fifth time T5 may be described similarly to operations in the first time T1, the second time T2, and the third time T3, respectively. At the fifth time T5, the sensing period SP may be ended, and a time period between the third and fifth times T3 and T5 may be referred to as a second time cycle CYCL2 following the first time cycle CYCL1. As described above, the sensing period SP may include one or more time cycles CYCL1 and CYCL2 to sense the user's touch through the selected sensing nodes 310.

The first pulse signal PS1 applied to the first sensing nodes 320 may have a form in which a plurality of square waves are repeated during the sensing period, and the second pulse signal PS2 applied to the second sensing nodes 330 may have a form in which a plurality of square waves having a phase opposite to that of the first pulse signal PS1 are repeated. In an embodiment, the first pulse signal PS1 and the second pulse signal PS2 have the same frequency as the target pulse signal TPS. Accordingly, since the second pulse signal PS2 having the phase opposite to that of the first pulse signal PS1 based on the first pulse signal PS1 without additional modulation is applied to the second sensing nodes 330, an electric field by the first pulse signal PS1 may be offset, thereby providing an EMI reduction effect.

Hereinafter, a method of controlling the sensor nodes that may be performed by the sensor device described with reference to FIGS. 1 to 10 is described.

Figure 11:
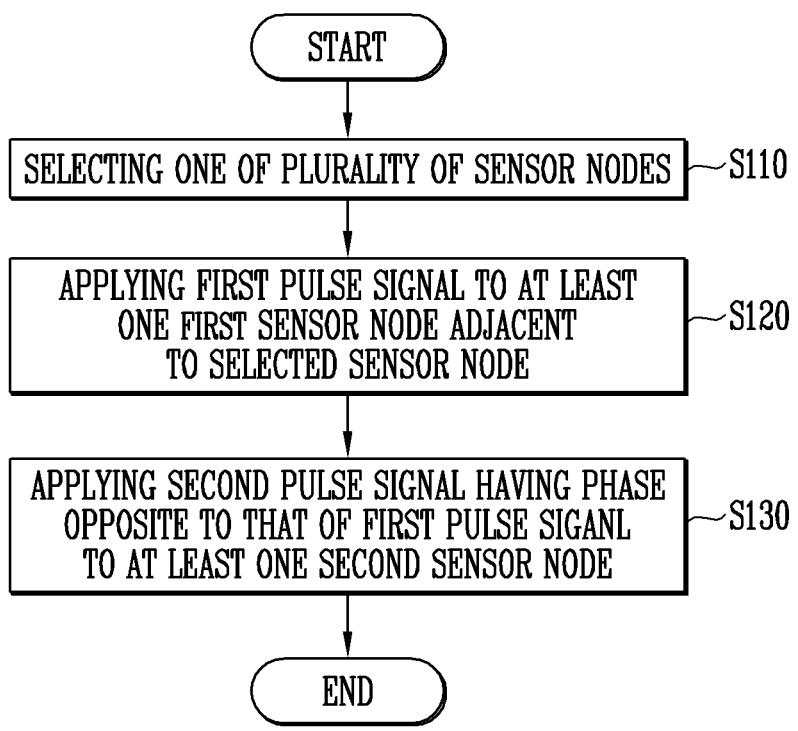
FIG. 11 is a flowchart illustrating an embodiment of a method of controlling the sensor nodes to sense a user's touch.

FIG. 11 is a flowchart illustrating an embodiment of a method of controlling the sensor nodes to sense the user's touch.

Referring to FIGS. 1 and 11, in S110, one of the plurality of sensor nodes included in the sensor array is selected. For example, the sensor device may select at least one of the plurality of sensor nodes $SN1_1$ to $SN1_m$, $SN21$ to $SN2_m$, . . . , and $SNn1$ to $SNnm$ included in the sensor array 110 and apply the target pulse signal. Here, the plurality of sensor nodes may be connected to the signal lines in a one-to-one manner. For example, each of the sensor nodes SN11 to $SN1_m$, SN21 to $SN2_m$, . . . , and SNn1 to SNnm may be sequentially selected. As another example, the sensor node may be selected from each of the first to n-th sensor node columns SNC1 to SNCn. In this case, n sensor nodes may be simultaneously selected. As still another example, column groups each including two or more sensor node columns may be defined, and the sensor node may be selected from each of the defined column groups.

The target pulse signal may toggle between a low voltage level (for example, TV1 of FIG. 10) and a high voltage level (for example, TV2 of FIG. 10). By charging the sensor node, the target pulse signal may transition from the low voltage level to the high voltage level. Without discharging the sensor node, the target pulse signal may gradually decrease from the high voltage level. Here, a slope of a gradually decreasing voltage level of the target pulse signal may change according to the user's touch. For example, a voltage level of the selected sensor node may gradually decrease according to a capacitance with the first sensor node to which the first pulse signal is applied. Accordingly, when the user's touch is not input, the voltage level of the target pulse signal may decrease relatively steeply, and when the user's touch is input, the voltage level of the target pulse signal may decrease relatively gently. The user's touch may be sensed by determining the slope of the voltage level of the target pulse signal.

In S120, the first pulse signal is applied to at least one first sensor node adjacent to the selected sensor node. When the target pulse signal is applied to the selected sensor node, the sensor device may apply the first pulse signal to first sensor nodes adjacent to the selected sensor node. In an embodiment, the first pulse signal has a waveform the same as or similar to that of the target pulse signal. In an embodiment, the first pulse signal has the same or substantially the same phase as the target pulse signal. For example, when the target pulse signal transitions from the low voltage level to the high voltage level, the first pulse signal transitions from the low voltage level to the high voltage level. When the target pulse signal gradually decreases from the high voltage level, the first pulse signal may transition from the high voltage level to the low voltage level.

In S130, when the first pulse signal is applied, the second pulse signal having a phase opposite to that of the first pulse signal is applied to at least one second sensor node among the plurality of sensor nodes. When the first pulse signal is applied to the first sensor nodes, the sensor device may apply the second pulse signal having the phase opposite to that of the first pulse signal to the second sensor nodes. For example, the second pulse signal may have the phase opposite to that of the first pulse signal. For example, when the first pulse signal transitions from a low voltage level to a high voltage level, the second pulse signal may transition from a high voltage level to a low voltage level. Accordingly, the second pulse signal may reduce EMI according to the first pulse signal.

As another example, the sensor device may set the second sensor node to at least one sensor node adjacent to or spaced apart from the first sensor node according to the preset mode. For example, when the sensor device operates in the first mode, for example, the single mode, the sensor device may set the sensor nodes spaced apart from the first sensor nodes as the second sensor nodes. In particular, the single mode may be applied in a case where the EMI radiation level is high, such as a case where the sensor array has a large width in a specific direction. Accordingly, the sensor device 100 may reduce a peak level of EMI radiation generated by a touch driving voltage of the first sensor node since the second sensor node is spaced apart, and a touch sensitivity reduction problem generated due to a lack of an offset of a parasitic capacitance formed by the trace may be improved.

As another example, the sensor device may set the sensor nodes neighboring the first sensor nodes as the second sensor nodes in the second mode different from the first mode, for example, the normal mode. The normal mode may be applied in a case where the sensor array has the same or similar width in all directions.

Figure 12:
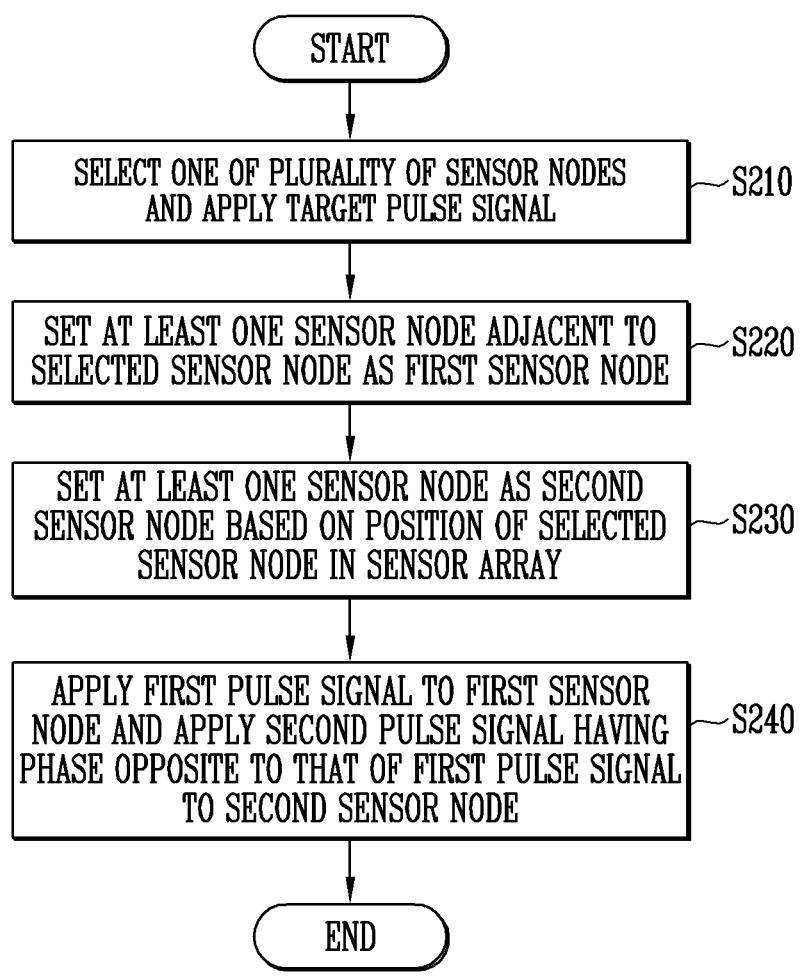
FIG. 12 is a flowchart illustrating another embodiment of a method of controlling the sensor nodes to sense the user's touch.

FIG. 12 is a flowchart illustrating another embodiment of a method of controlling the sensor nodes to sense the user's touch.

S210, S220, S230, and S240 are described similarly to S110, S120, and S130 of FIG. 11. Hereinafter, an overlapping description is omitted.

Referring to FIGS. 1 and 12, in S210, one of the plurality of sensor nodes included in the sensor array is selected and the target pulse signal is applied. For example, the target pulse signal may be applied to the selected sensor node.

In S220, at least one sensor node adjacent to the selected sensor node is set as the first sensor node. For example, at least one sensor node adjacent to the selected sensor node is determined to be the first sensor node. The sensor device may set the sensor nodes neighboring the selected sensor nodes 310 among the plurality of sensor nodes of the sensor array without a sensor node interposed therebetween as the first sensor nodes 320. For example, when the user's touch is sensed and the selected sensor nodes 310 is a plurality of sensor nodes SN1n, SN2n, . . . , and SNnn in an n-th row, the sensor device may set sensor nodes of an (n−1)-th row and an (n+1)-th row as the first sensor nodes 320.

In S230, at least one sensor node is set as the second sensor node based on the position of the selected sensor node in the sensor array. For example, the sensor device may set or determine the second sensor nodes 330 from the plurality of sensor nodes according to the position of the selected sensor nodes 310 in the sensor array. Here, the sensor array may include a pad connected to at least a portion of the plurality of sensor nodes at one side. In addition, the sensor array may have a first width in the first direction, have a second width greater than the first width in the second direction crossing the first direction, and one side of the sensor array may extend in the first direction.

For example, the sensor device may differently set the number of second sensor nodes disposed in a given area according to a distance from one side of the sensor array 110 where the pad PD is disposed to the selected sensor nodes 310. For example, when the selected sensor nodes 310 is the third sensor node among the plurality of sensor nodes, the sensor device may set or determine the sensor nodes disposed in the first area of the sensor array to be the second sensor nodes 330. In addition, when the selected sensor nodes 310 is the fourth sensor node positioned closer from one side of the sensor array than the third sensor node among the plurality of sensor nodes, the sensor device may set or determine the sensor nodes disposed in the second area of the sensor array to be the second sensor nodes. In an embodiment, the number of sensor nodes in the first area set as the second sensor nodes 330 is greater than the number of sensor nodes in the second area.

As another example, the sensor device may set the second sensor nodes to the sensor nodes spaced apart by the first distance from the first sensor nodes 320 with another sensor node interposed therebetween according to a distance from one side of the sensor array 110 where the pad PD is disposed to the selected sensor nodes 310. For example, when the selected sensor nodes 310 is the third sensor node among the plurality of sensor nodes, at least one second sensor nodes 330 may be spaced apart from at least one first sensor nodes 320 by a first distance. When the selected sensor node is the fourth sensor node positioned closer from one side of the sensor array than the third sensor node, at least one second sensor nodes 330 may be spaced apart from at least one first sensor node 320 by a second distance. In an embodiment, the first distance is shorter than the second distance. Therefore, the sensor device may set or determine sensor nodes from the first sensor nodes 320 having a shorter distance away from one side of the sensor array 110 as the second sensor nodes 330 as the selected sensor nodes 310.

In S240, the first pulse signal is applied to the first sensor node, and the second pulse signal having the phase opposite to that of the first pulse signal is applied to the second sensor node (S240). When applying the first pulse signal to the first sensor node, the sensor device may apply the second pulse signal having the phase opposite to that of the first pulse signal to at least one second sensor node spaced apart from the first sensor nodes 320 by a predetermined distance with at least another sensor node interposed therebetween.

Figure 13:
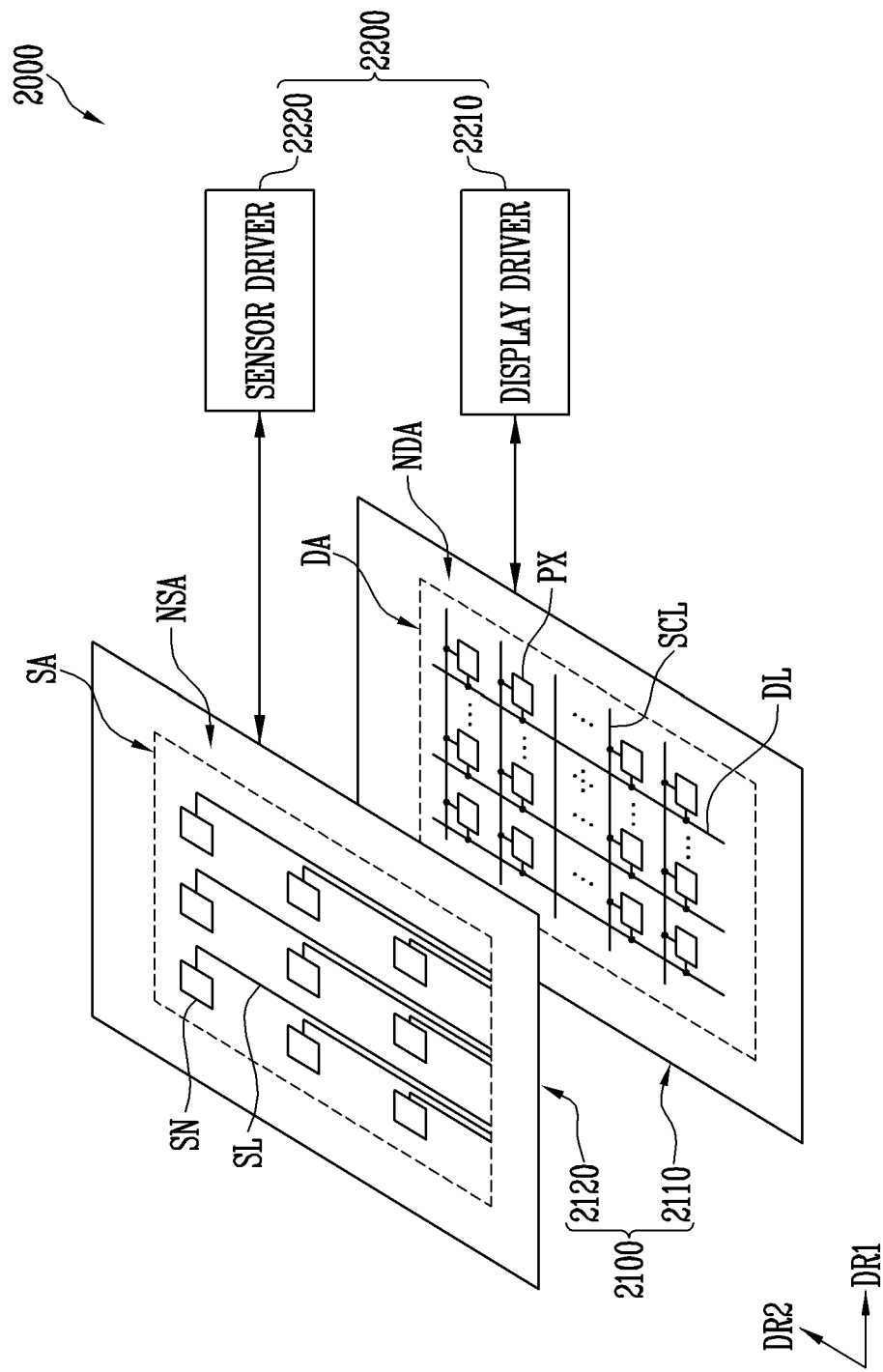
FIG. 13 is a block diagram illustrating an embodiment of a display device including the sensor device of FIG. 1.

FIG. 13 is a block diagram illustrating an embodiment of a display device including the sensor device of FIG. 1.

Referring to FIG. 13, the display device 2000 includes a panel 2100 and a panel driver 2200 for driving the panel 2100.

The panel 2100 may include a display panel 2110 and a touch panel 2120 overlapping the display panel 2110. For example, the display panel 2110 and the touch panel 2120 may be separately manufactured and then coupled to at least partially overlap each other. As another example, the display panel 2110 and the touch panel 2120 may be integrally manufactured. In this case, the touch panel 2120 may be directly formed on at least one layer configuring the display panel 2110, for example, an upper substrate, a thin film encapsulation layer, or an insulating layer of the display panel 2110.

In FIG. 13, the touch panel 2120 is disposed on the display panel 2110, but embodiments of the disclosure are not limited thereto. For example, the touch panel 2120 may be disposed under the display panel 2110.

The display panel 2110 may include a display area DA for displaying an image and a non-display area NDA around the display area DA. The non-display area NDA may at least partially surround the display area DA. In an embodiment, no images are displayed in the non-display area NDA.

The display panel 2110 may include pixels PX arranged along the first direction DR1 and the second direction DR2 on a substrate. The pixels PX may be disposed in the display area DA. For example, the substrate may be a rigid substrate including a material such as glass or tempered glass. In other embodiments, the substrate may be a flexible substrate including a material such as plastic or metal.

The pixels PX may be connected to scan lines SL extending in the first direction DR1 and data lines DL extending in the second direction DR2. The pixels PX may be selected by a scan signal of a turn-on level supplied through the scan lines SL and may receive data signals through the data lines DL. Accordingly, the pixels PX may emit light of luminance corresponding to the data signals, and an image may be displayed in the display area DA.

Lines and/or an embedded circuit connected to the pixels PX may be disposed in the non-display area NDA. For example, a scan driver may be further disposed in the non-display area NDA.

For example, the display panel 2110 may include organic light emitting elements (organic light emitting diodes), inorganic light emitting elements (inorganic light emitting diodes), quantum dot/well light emitting elements (quantum dot/well light emitting diodes), and the like as the pixels PX. As another example, the display panel 2110 may be implemented as a liquid crystal display panel. In this case, the display device 2000 may additionally include a light source such as a back-light unit.

The touch panel 2120 may include an active area SA capable of sensing a touch and a non-active area NSA around the active area SA. The active area SA may at least partially overlap the display area DA.

The touch panel 2120 may include sensor nodes SN arranged along the first direction DR1 and the second direction DR2 on a sensor substrate. The sensor nodes SN may be disposed in the active area SA. For example, the substrate may be a rigid substrate including a material such as glass or tempered glass. As another example, the substrate may be a flexible substrate including a material such as plastic or metal. In addition, for example, at least one layer configuring the display panel 2110 may be used as the substrate of the touch panel 2120.

The sensor nodes SN may be connected to the sensing lines SL. When the touch panel 2120 is driven in a self-capacitance method, the sensor nodes SN may be one-to-one connected to the sensing lines SL. The touch panel 2120 may include the sensor array 110 of FIG. 1. For example, the active area SA may be the sensor array 110.

The panel driver 2200 may include a display driver 2210 for driving the display panel 2110 and a sensor driver 2220 for driving the touch panel 2120. For example, the display driver 2210 and the touch driver 2220 may be configured as separate integrated chips (ICs). As another example, the display driver 2210 and the sensor driver 2220 may be mounted in one IC.

The display driver 2210 may be electrically connected to the display panel 2110 to drive the pixels PX. For example, the display driver 2210 may include a data driver connected to the data lines DL, a scan driver connected to the scan lines SL, and a timing controller controlling the data driver and the scan driver. As another example, the display driver 2210 may include the data driver and the timing controller, and the scan driver may be disposed in the non-display area NDA of the display panel 2110.

The sensor driver 2220 may be connected to the touch panel 2120 to drive the touch panel 2120. The sensor driver 2220 may include the sensor driver 120 of FIG. 1.

The display driver 2210 may display an image on the display panel 2110 in units of a display frame. The sensor driver 2220 may sense the touch in units of a sensing frame). For example, during a sensing frame, the sensor driver 2220 may select each of the sensor nodes SN to sense the touch. A sensing frame period and a display frame period may be synchronized or asynchronous with each other.

For example, the display device 2000 may be employed in an electronic device such as a computer, a laptop, a cellular phone, a smart phone, a personal digital assistant (PDA), a portable multimedia player (PMP), a digital TV, a digital camera, a portable game console, a navigation device, a wearable device, Internet of things (IoT) device, Internet of everything (IoE) device, an e-book, a virtual reality (VR) device, an augmented reality (AR) device, a vehicle navigation system, a video phone, a surveillance system, an autofocus system, a tracking system, and a motion detection system.

According to embodiments of the disclosure, the sensor device, the display device including the sensor device, and the method of controlling the sensor node, in which occurrence of EMI is minimized or at least reduced while touch sensitivity reduction is compensated, are provided.

Although specific embodiments and application examples are described herein, other embodiments and modifications may be derived from the above description. Therefore, the spirit of the disclosure is not limited to these embodiments, and extends to the claims set forth below, various obvious modifications, and equivalents.

What is claimed is:

1. A sensor device comprising:
   a sensor array including a plurality of sensor nodes;
   signal lines electrically connected to the plurality of sensor nodes; and
   a sensor driver configured to sense a user's touch of the sensor array by selecting the plurality of sensor nodes through the signal lines, apply a first pulse signal having a same phase as a target pulse signal of a selected sensor node to at least one first sensor node adjacent to the selected sensor node among the plurality of sensor nodes, and apply a second pulse signal having a phase opposite to that of the first pulse signal to at least one second sensor node among the plurality of sensor nodes,
   wherein the sensor driver sets at least one sensor node adjacent to or spaced apart from the first sensor node as the second sensor node according to a preset mode.

2. The sensor device according to claim 1, wherein the sensor driver sets the at least one sensor node spaced apart from the first sensor node as the second sensor node when the preset mode is a first mode.

3. The sensor device according to claim 2, wherein the sensor driver sets the at least one sensor node adjacent to the first sensor node as the second sensor node when the preset mode is a second mode different from the first mode.

4. The sensor device according to claim 1, wherein the sensor driver sets the at least one second sensor node from the plurality of sensor nodes according to a position of the selected sensor node within the sensor array.

5. The sensor device according to claim 1, wherein the sensor array includes pads connected to at least a portion of the plurality of sensor nodes at one side,
the sensor driver sets sensor nodes disposed in a first area of the sensor array as the second sensor nodes when the selected sensor node is a third sensor node among the plurality of sensor nodes, sets sensor nodes disposed in a second area of the sensor array as the second sensor nodes when the selected sensor node is a fourth sensor node positioned closer to the one side of the sensor array than the third sensor node among the plurality of sensor nodes, and
the number of sensor nodes of the first area is greater than the number of sensor nodes of the second area.

6. The sensor device according to claim 5, wherein the sensor array has a first width in a first direction, has a second width greater than the first width in a second direction crossing the first direction, and the one side of the sensor array extends in the first direction.

7. The sensor device according to claim 1, wherein the sensor array includes pads connected to at least a portion of the plurality of sensor nodes at one side,
when the selected sensor node is a third sensor node among the plurality of sensor nodes, the at least one second sensor node is spaced apart from the at least one first sensor node by a first distance,
when the selected sensor node is a fourth sensor node positioned closer to the one side of the sensor array than the third sensor node among the plurality of sensor nodes, the at least one second sensor node is spaced apart from the at least one first sensor node by a second distance, and
the first distance is shorter than the second distance.

8. The sensor device according to claim 1, wherein each of the first pulse signal and the second pulse signal is toggled between a first voltage level and a second voltage level, and
in a time period in which the first pulse signal transitions from the first voltage level to the second voltage level, the second pulse signal transitions from the second voltage level to the first voltage level.

9. The sensor device according to claim 1, wherein each of the plurality of sensor nodes is connected to a corresponding one the plurality of signal lines.

10. A method of controlling sensor nodes to sense a user's touch, the method comprising:
selecting a sensor node among a plurality of sensor nodes included in a sensor array;
applying a first pulse signal having a same phase as a target pulse signal of the selected sensor node to at least one first sensor node adjacent to the selected sensor node among the plurality of sensor nodes; and
applying a second pulse signal having a phase opposite to that of the first pulse signal to at least one second sensor node among the plurality of sensor nodes, when the first pulse signal is applied,
wherein at least one sensor node adjacent to or spaced apart from the first sensor node is set as the second sensor node according to a preset mode.

11. The method according to claim 10, wherein when the preset mode is a first mode, the at least one sensor node spaced apart from the first sensor node is set as the second sensor node.

12. The method according to claim 11, wherein when the preset mode is a second mode different from the first mode, the at least one sensor node adjacent the first sensor node is set as the second sensor node.

13. The method according to claim 10, wherein the at least one second sensor node is set from the plurality of sensor nodes according to a position of the selected sensor node within the sensor array.

14. The method according to claim 10, wherein the sensor array includes pads connected to at least a portion of the plurality of sensor nodes at one side,
sensor nodes disposed in a first area of the sensor array are set as the second sensor nodes when the selected sensor node is a third sensor node among the plurality of sensor nodes,
sensor nodes disposed in a second area of the sensor array are set as the second sensor nodes when the selected sensor node is a fourth sensor node positioned closer to the one side of the sensor array than the third sensor node among the plurality of sensor nodes, and
the number of sensor nodes of the first area is greater than the number of sensor nodes of the second area.

15. The method according to claim 14, wherein the sensor array has a first width in a first direction, has a second width greater than the first width in a second direction crossing the first direction, and the one side of the sensor array extends in the first direction.

16. The method according to claim 10, wherein the sensor array includes pads connected to at least a portion of the plurality of sensor nodes at one side,
when the selected sensor node is a third sensor node among the plurality of sensor nodes, the at least one second sensor node is spaced apart from the at least one first sensor node by a first distance,
when the selected sensor node is a fourth sensor node positioned closer to the one side of the sensor array than the third sensor node among the plurality of sensor nodes, the at least one second sensor node is spaced apart from the at least one first sensor node by a second distance, and
the first distance is shorter than the second distance.

17. The method according to claim 10, wherein each of the first pulse signal and the second pulse signal is toggled between a first voltage level and a second voltage level, and
in a time period in which the first pulse signal transitions from the first voltage level to the second voltage level, the second pulse signal transitions from the second voltage level to the first voltage level.

18. The method according to claim 10, wherein each of the plurality of sensor nodes are connected to a corresponding one of a plurality of signal lines.

19. A display device comprising:
a display panel including a plurality of pixels;
a display driver configured to drive the plurality of pixels;
a sensor array overlapping the display panel and including a plurality of sensor nodes;
signal lines electrically connected to the plurality of sensor nodes; and
a sensor driver configured to sense a user's touch of the sensor array by applying a target pulse signal to a selected one of the plurality of sensor nodes, applying a first pulse signal having a same phase as the target pulse signal to at least one first sensor node adjacent to the selected sensor node among the plurality of sensor nodes, and applying a second pulse signal having a phase opposite to that of the first pulse signal to at least one second sensor node among the plurality of sensor nodes, wherein a count of the at least one second sensor node is a first value when the selected sensor node is a first distance away from a pad connected to some of the plurality of sensors nodes and the count is a second value smaller than the first value when the selected sensor node is a second distance away from the pad that is smaller than the first distance.

20. The display device of claim 19, wherein the at least one second sensor node is adjacent to the first sensor node during a first mode and spaced apart from the first sensor node during a second mode different from the first mode.

* * * * *